(12) United States Patent
Hirschmann et al.

(10) Patent No.: US 7,271,547 B2
(45) Date of Patent: Sep. 18, 2007

(54) HIGH-PRESSURE DISCHARGE LAMP HAVING A PULSE STARTING DEVICE, AND OPERATING METHOD FOR A HIGH PRESSURE DISCHARGE LAMP

(75) Inventors: Günther Hirschmann, Munich (DE); Bernhard Siessegger, Munich (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 0 days.

(21) Appl. No.: 11/272,085

(22) Filed: Nov. 14, 2005

(65) Prior Publication Data

US 2006/0108942 A1 May 25, 2006

(30) Foreign Application Priority Data

Nov. 19, 2004 (DE) .................. 10 2004 056 002

(51) Int. Cl.
*H05B 41/16* (2006.01)
(52) U.S. Cl. .................................................. 315/274
(58) Field of Classification Search .......... 315/56, 315/60, 63–64, 68, 109, 244, 246, 274; 313/631, 313/634, 635, 636, 637
See application file for complete search history.

(56) References Cited

U.S. PATENT DOCUMENTS

| | | | |
|---|---|---|---|
| 4,743,810 A | 5/1988 | Daniels | |
| 5,543,690 A * | 8/1996 | Bernicke et al. | 315/224 |
| 6,034,477 A | 3/2000 | Peeters | |
| 6,798,139 B2 * | 9/2004 | Ramaiah et al. | 313/634 |
| 2003/0052622 A1 * | 3/2003 | Okamoto et al. | 315/261 |
| 2003/0209986 A1 * | 11/2003 | Ishigami et al. | 313/641 |
| 2003/0222584 A1 * | 12/2003 | Deguchi et al. | 313/638 |
| 2005/0099129 A1 * | 5/2005 | Ishigami et al. | 313/637 |

FOREIGN PATENT DOCUMENTS

| | | |
|---|---|---|
| DE | 27 17 853 | 11/1977 |
| DE | 31 48 821 A1 | 7/1982 |
| DE | 196 10 385 A1 | 9/1997 |
| WO | WO 98/18297 | 4/1998 |

* cited by examiner

*Primary Examiner*—Shih-Chao Chen
*Assistant Examiner*—Minh Dieu A
(74) *Attorney, Agent, or Firm*—William E. Meyer

(57) ABSTRACT

The invention relates to a high-pressure discharge lamp having electrodes arranged inside a discharge vessel which define a discharge path of a gas discharge in the discharge vessel, and having a starting device, arranged inside the lamp base for the high-pressure discharge lamp and designed as a pulse starting device, for starting the gas discharge in the discharge vessel, and having, arranged outside its discharge vessel, an auxiliary starting electrode coupled to the pulse starting device, the voltage input of pulse starting device being connected in parallel with the discharge path of the high-pressure discharge lamp, such that according to the invention the voltage across the discharge path serves as supply voltage for the pulse starting device. Also disclosed is an operating method for such a high-pressure discharge lamp.

4 Claims, 4 Drawing Sheets

Figure 1:
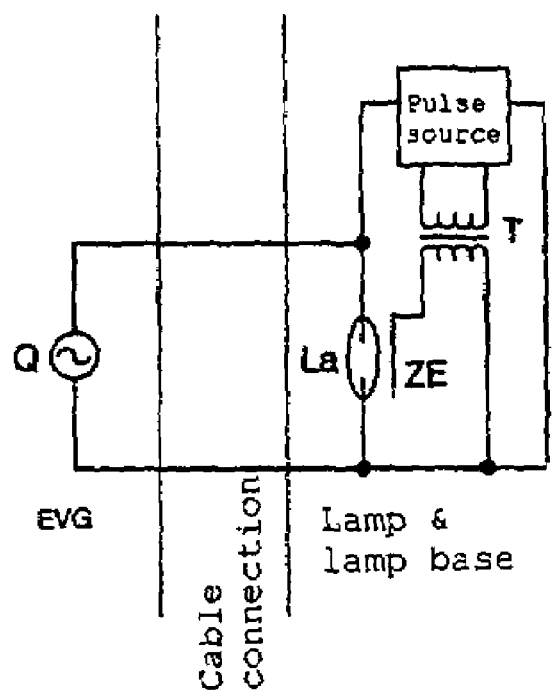

HIGH-PRESSURE DISCHARGE LAMP HAVING A PULSE STARTING DEVICE, AND OPERATING METHOD FOR A HIGH PRESSURE DISCHARGE LAMP

I. TECHNICAL FIELD

The invention relates to a high-pressure discharge lamp having electrodes arranged inside a discharge vessel which define a discharge path of a gas discharge in the discharge vessel, and having a starting device, arranged inside the lamp base for the high-pressure discharge lamp and designed as a pulse starting device, for starting the gas discharge in the discharge vessel, and having, arranged outside its discharge vessel, an auxiliary starting electrode coupled to the pulse starting device, and to an operating method for a high-pressure discharge lamp.

II. BACKGROUND ART

Such a high-pressure discharge lamp is disclosed, for example, in WO 98/18297. This laid-open patent application describes a high-pressure discharge lamp having an auxiliary starting electrode and a pulse starting device, arranged in the lamp base, for starting the gas discharge in the discharge vessel of the high-pressure discharge lamp. The pulse starting device and the operating circuit for the high-pressure discharge lamp are electrically isolated from one another by means of a transformer. Both the pulse starting device and the operating circuit are connected in each case for their voltage supply to a secondary winding of the transformer, whose primary windings are designed as a constituent of a push-pull inverter. The pulse starting device is shut down after successful starting of the gas discharge by means of a semiconductor switch.

III. DISCLOSURE OF THE INVENTION

It is an object of the invention to provide a high-pressure discharge lamp of the generic type having a simplified voltage supply for the starting device, and to specify the corresponding operating method.

The high-pressure discharge lamp according to the invention has electrodes that are arranged inside its discharge vessel which define a discharge path, and a starting device, arranged inside its lamp base and designed as a pulse starting device, for starting the gas discharge in the discharge vessel, as well as an auxiliary starting electrode arranged outside the discharge vessel, the voltage input of the pulse starting device being, according to the invention, connected in parallel with the discharge path of the high-pressure discharge lamp.

The pulse starting device can thereby be supplied with energy directly from the voltage drop across the discharge path of the high-pressure discharge lamp. A separate generation of the supply voltage for the starting device is thereby eliminated. Moreover, there is no need for a switch for deactivating the pulse starting device after successful starting of the gas discharge in the lamp, since the voltage drop across the discharge path decreases substantially after successful starting of the gas discharge, and consequently voltage present at the pulse starting device no longer suffices to generate starting voltage pulses.

It is preferred in the case of the high-pressure discharge lamp according to the invention for the starting capacitor of the pulse starting device to be arranged in a DC path connected in parallel with the discharge path of the high-pressure discharge lamp. As a result, the charging current for the starting capacitor is generated directly from the voltage drop across the discharge path of the high-pressure discharge lamp. During the starting phase of the high-pressure discharge lamp, the discharge path is electrically isolated, and the starting capacitor is consequently charged to a sufficiently high voltage in order to enable its pulsed discharge via a spark gap or an equivalent threshold value component, and the generation of starting voltage pulses by means of the starting transformer and the auxiliary starting electrode. After termination of the starting phase, the discharge path of the high-pressure discharge lamp is electrically conductive, and the voltage drop across the discharge path then corresponds only to the operating voltage of the high-pressure discharge lamp, which no longer suffices to generate further starting voltage pulses by means of the pulse starting device.

A series resonant circuit is additionally advantageously accommodated in the lamp base of the high-pressure discharge lamp according to the invention, at least one electric component that is designed as a constituent of the series resonant circuit, for example the resonance capacitor or the resonance inductor, being connected in parallel with the discharge path. At least during the starting phase of the high-pressure discharge lamp, the series resonance circuit and the above named electric component connected in parallel with the discharge path generates a resonant AC voltage peak that drops against the discharge path and is therefore also present at the voltage input of the pulse starting device. It is thereby possible for the electric contacts of the high-pressure discharge lamp, and for the electric supply leads to the high-pressure discharge lamp, to be preassembled for low voltages, since all electric components conducting higher voltage are accommodated in the lamp base. The series resonance circuit further ensures a reliable transition from the instant of the first breakdown of the discharge path between the two electrodes of the high-pressure discharge lamp until an arc discharge with a cathode emitting electrons thermally is set up. The transition is also denoted as glow-to-arc transition.

In accordance with a preferred exemplary embodiment of the invention, a DC voltage isolating capacitor is advantageously provided in order to reduce the sodium loss in the discharge plasma caused by the diffusion of sodium ions to the discharge vessel wall. The capacitance of the DC voltage isolating capacitor is dimensioned in this case such that on the one hand a sufficiently high voltage for starting the gas discharge is applied to the auxiliary starting electrode, and on the other hand the above named sodium diffusion is reduced to a sufficient extent. In the event of too high a capacitance or too high a leakage current of the DC voltage isolating capacitor, no sufficient reduction in the sodium diffusion is achieved, and in the event of too small a capacitance it is not possible to supply a sufficiently high voltage for starting the gas discharge to the auxiliary starting electrode. The DC voltage isolating capacitor is preferably connected between the secondary winding of the starting transformer and the auxiliary starting electrode.

IV. BRIEF DESCRIPTION OF THE DRAWINGS

Figure 2:
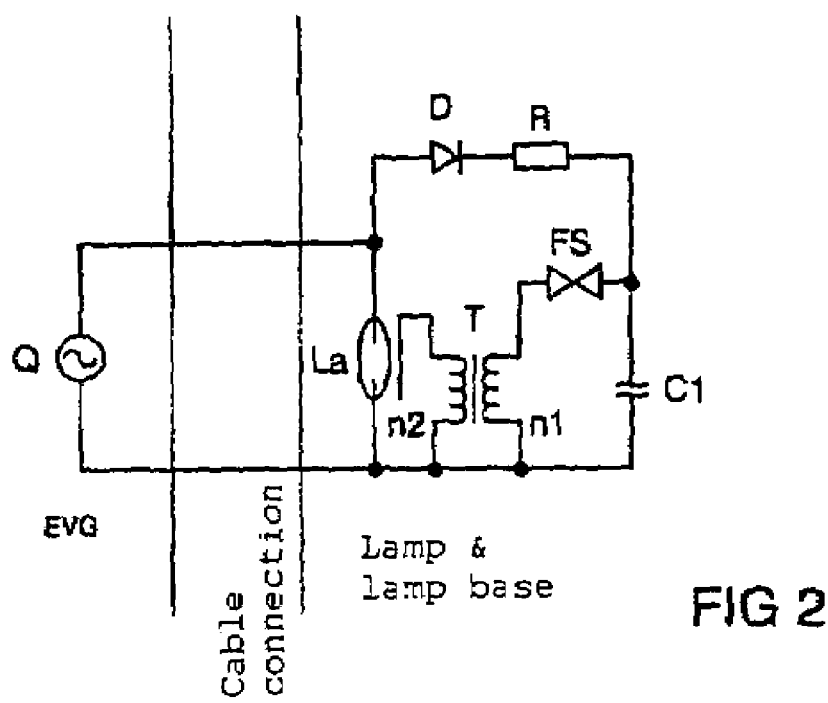
Figure 3:
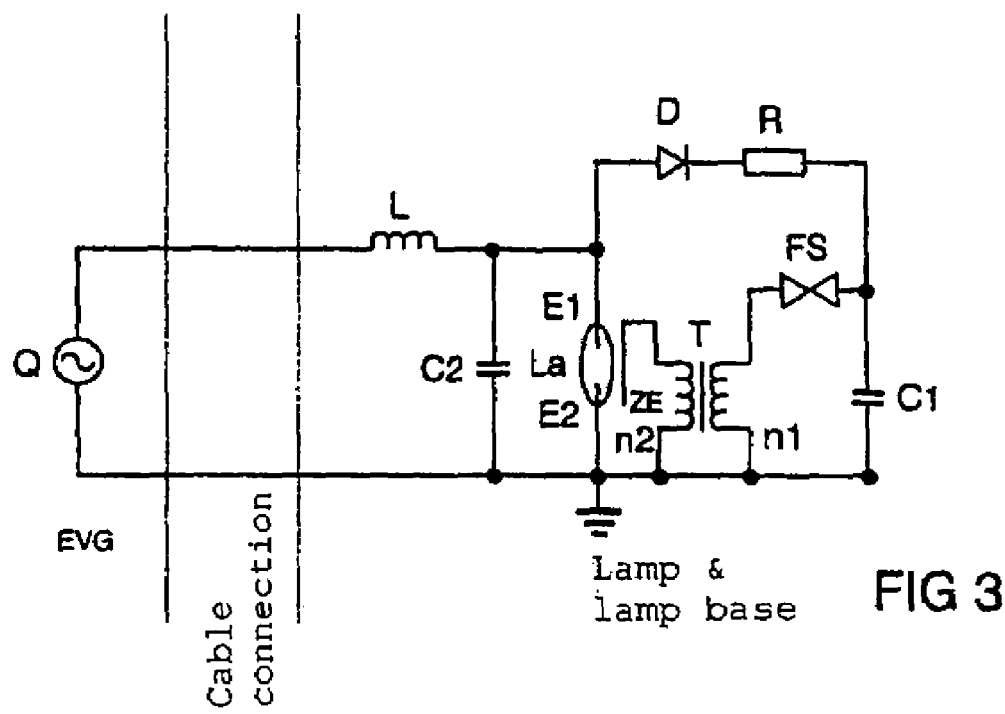
Figure 4:
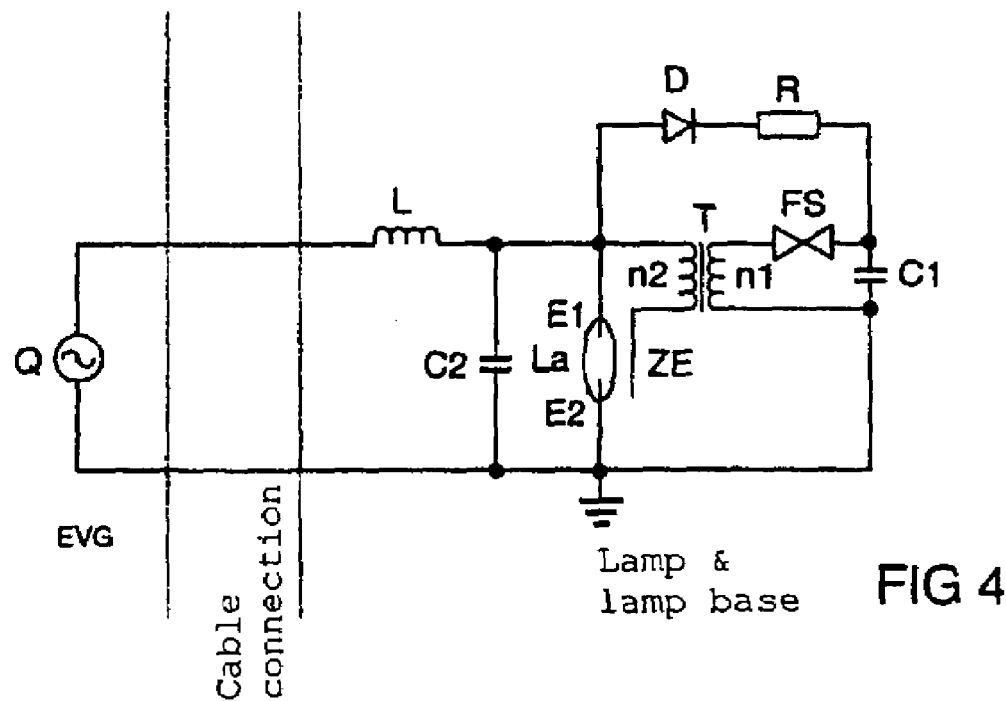
Figure 5:
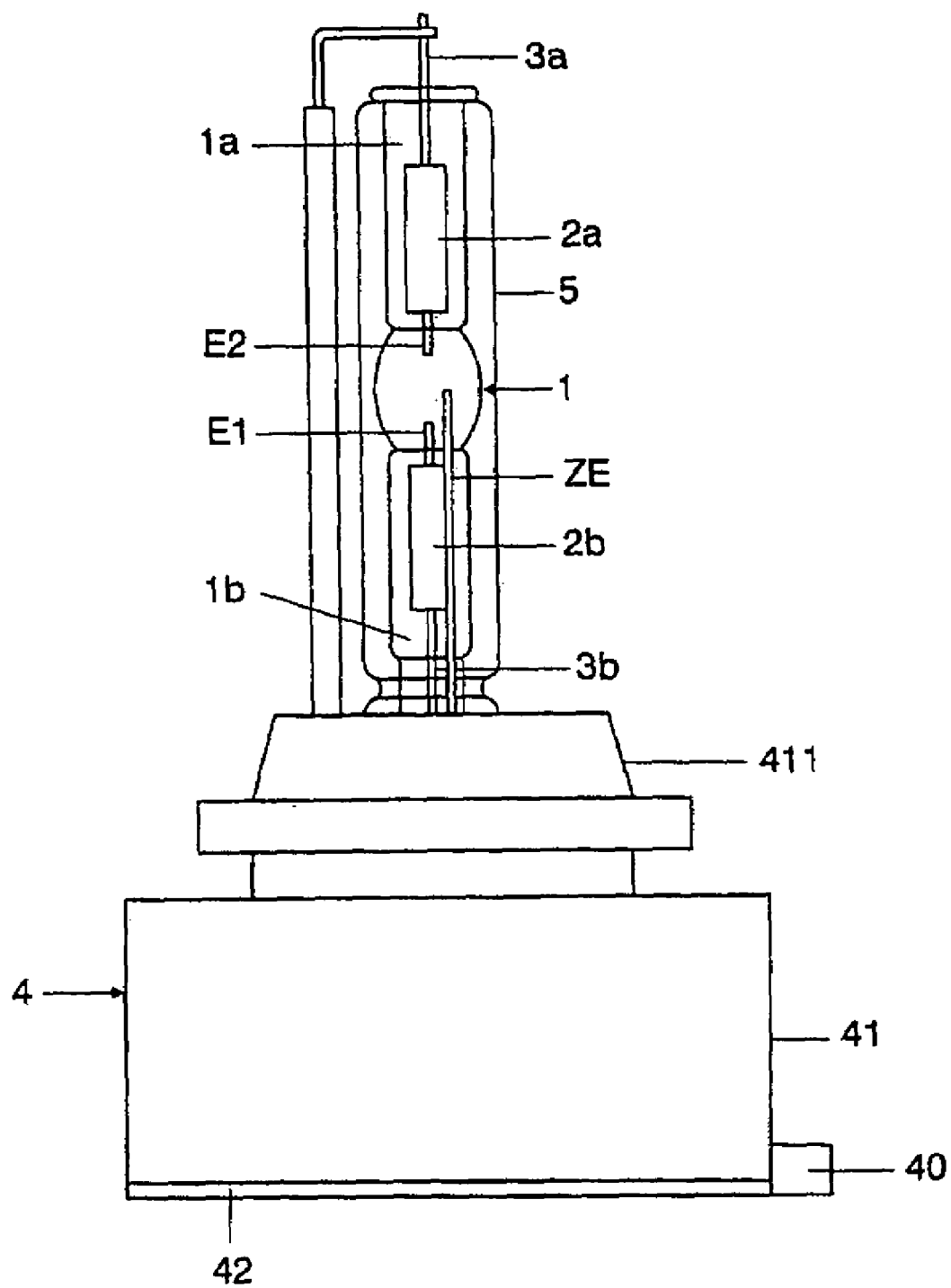
Figure 6:
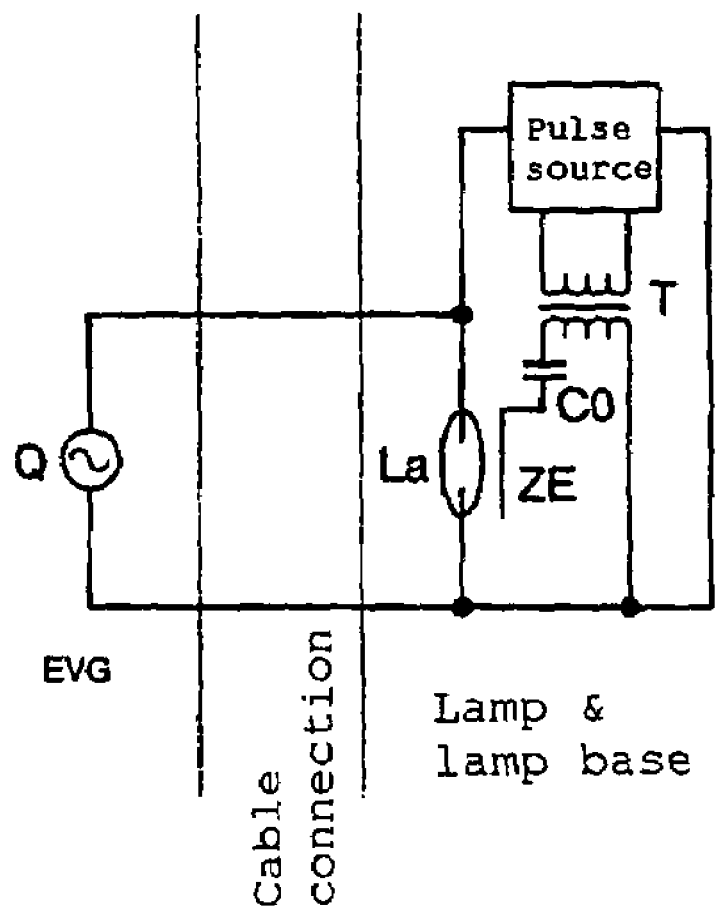

The invention is explained in more detail below with the aid of a preferred exemplary embodiment. In the drawing:

FIG. 1 shows a sketched circuit diagram of the high-pressure discharge lamp according to the invention, with pulse starting device, FIG. 2 shows the sketched circuit diagram from FIG. 1 with details of the pulsed starting device, FIG. 3 shows a sketched circuit diagram of the first exemplary embodiment of the high-pressure discharge lamp according to the invention, with pulse starting devices, FIG. 4 shows a sketched circuit diagram of the second exemplary embodiment of the high-pressure discharge lamp according to the invention, with pulse starting device, FIG. 5 shows a schematic side view of the high-pressure discharge lamp in accordance with the preferred exemplary embodiment of the invention, and FIG. 6 shows a sketched circuit diagram of the third exemplary embodiment of the high-pressure discharge lamp according to the invention, with pulse starting device.

V. BEST MODE FOR CARRYING OUT THE INVENTION

The high-pressure discharge lamp in accordance with the preferred exemplary embodiment of the invention illustrated schematically in FIG. 5 is a metal-halide high-pressure discharge lamp for a motor vehicle headlight. This high-pressure discharge lamp La has a discharge vessel 1 made from quartz glass, in which an ionizable filling is enclosed in a gastight fashion. The ionizable filling contains xenon and metal halide compounds, preferably iodides of the metals sodium, scandium, zinc and indium, and the ionizable filling preferably contains no mercury. The xenon cold filling pressure is approximately 10 bars. The two ends 1$a$, 1$b$ of the discharge vessel 1 are sealed in each case by means of a molybdenum foil seal 2$a$, 2$b$. Located in the interior of the discharge vessel 1 are two electrodes E1, E2 between which the discharge arc responsible for the light emission forms during operation of the lamp. These main electrodes E1, E2 are connected in an electrically connecting fashion, via one of the molybdenum foil seals 2$a$, 2$b$ in each case, to a supply lead 3$a$, 3$b$ guided out of the discharge vessel 1. The discharge vessel 1 is enclosed by a vitreous outer bulb 5. The auxiliary starting electrode ZE is formed here in the case of this exemplary embodiment of the invention by a thin metallic coating on the inner surface of the outer bulb 5. Alternatively, this coating can, however, also be applied to the outside of the discharge vessel 1. The thin metallic coating ZE takes the form of an elongated strip that extends from the end of the outer bulb 5 near the base approximately up to the level of the midpoint of the discharge vessel. The lamp vessels 1, 5 are fixed in a top part 411, consisting of plastic, of a lamp base 4. The cuboidal part of the lamp base 4 is surrounded by a bipartite metallic housing 41, 42 that serves to provide electromagnetic shielding for the pulse starting device accommodated in the interior of the lamp base 4. The electric connection 40 of the high-pressure discharge lamp La serves to supply power to the high-pressure discharge lamp and to the pulse starting device arranged in the lamp base 4. The electric connection 40 is connected to the operating unit EVG (not illustrated) for the high-pressure discharge lamp via a shielded connecting cable (not illustrated). The shielding braid of the connecting cable is connected to the circuit-internal ground potential of the operating unit and, via a contact of the electric connection 40, to the metal housing 41, 42 such that the metal housing 41, 42 is likewise at ground potential.

FIG. 1 is a sketched circuit diagram of the high-pressure discharge lamp according to the invention, of the pulse starting device (denoted as pulse source in FIG. 1) arranged in the lamp base 4, and of the operating unit EVG. The operating unit EVG serves as AC voltage source Q for the high-pressure discharge lamp and the pulse starting device accommodated in the lamp base 4. The operating unit EVG is connected via a shielded connecting cable (not illustrated) to the electric connection 40 of the high-pressure discharge lamp such that the AC voltage generated by the operating unit EVG is applied to the electrodes E1, E2 of the high-pressure discharge lamp La and the voltage input of the pulse starting device (pulse source). The voltage input of the pulse starting device is connected in parallel with the discharge path of the high-pressure discharge lamp defined by the electrodes E1, E2. The secondary winding n2 of the pulse transformer T of the pulse starting device is connected to the auxiliary starting electrode ZE of the high-pressure discharge lamp La.

FIG. 2 illustrates details of the pulse starting device (pulse source). The AC voltage provided by the AC voltage source Q is fed to the voltage input of the pulse starting device and rectified by the diode D in order, via the resistor R, to charge the starting capacitor C1, which is connected in a DC path in parallel with the discharge path of the high-pressure discharge lamp La. The spark gap FS and the primary winding n1 of the starting transformer T are connected in parallel with the starting capacitor C1. Once the voltage across the starting capacitor C1 reaches the breakdown voltage of the spark gap FS, the starting capacitor C1 discharges via the spark gap FS and the primary winding n1. Consequently, there are induced in the secondary winding n2 of the starting transformer T, which is connected to the auxiliary starting electrode ZE, high voltage pulses that are fed to the auxiliary starting electrode ZE and lead to the starting of the gas discharge in the discharge vessel 1 of the high-pressure discharge lamp.

FIG. 3 is a schematic of the first embodiment of the high-pressure discharge lamp La according to the invention, including the components D, R, FS, C1, T, accommodated in the lamp base 4, of the pulse starting device and of a series resonant circuit L, C2. The components L, C2 of the series resonant circuit are likewise accommodated in the lamp base 4. The resonance capacitor C2 is connected in parallel with the discharge path of the high-pressure discharge lamp La. A first connection of the secondary winding n2 of the starting transformer T is connected to the circuit-internal ground reference potential. The second connection of the secondary winding n2 of the starting transformer T is connected to the auxiliary starting electrode ZE. During the starting phase of the high-pressure discharge lamp La, the series resonant circuit L, C2 is operated in resonance such that there is provided across the resonance capacitor C2, and therefore also over the discharge path of the high-pressure discharge lamp La as well as at the voltage input of the pulse starting device a resonant AC voltage peak with an amplitude that is higher by the factor of 2 to 10 than the AC voltage generated by the AC voltage source Q. With the aid of the components D, R, FS, C1, T of the pulse starting device, high voltage pulses are generated therefrom for the auxiliary starting electrode, with voltages in the range from approximately 5 kV to 30 kV. A suitable dimensioning of the electric components of the pulse starting device and of the series resonant circuit for generating a starting voltage of approximately 30 kV or a starting voltage of approximately 5 kV is disclosed in the tables 1 and 2, respectively.

The operating unit EVG is a voltage transformer that generates from the voltage of the motor vehicle's electrical system a virtually sinusoidal AC voltage with an amplitude of approximately 100 V to 500 V and a frequency of approximately 2.6 MHz during the starting phase of the high-pressure discharge lamp, and a frequency of approximately 1 MHz after termination of the starting phase.

The second exemplary embodiment of the invention shown in the schematic of FIG. 4 differs from the exemplary embodiment illustrated in FIG. 3 only in that the first connection of the secondary winding n2 of the starting transformer T is connected to the electrode E1 at a high electric potential, and not to the circuit-internal ground reference potential. In all other details, the exemplary embodiments illustrated in FIGS. 3 and 4 correspond. Consequently, identical components are provided in these figures with identical reference symbols.

After successful starting of the gas discharge in the discharge vessel 1 of the high-pressure discharge lamp La, the now conductive discharge path between the two electrodes E1, E2 forms a bypass to the resonance capacitor C2 and the voltage input of the pulse starting device such that the voltage across the discharge path and thus also at the voltage input of the pulse starting device assumes substantially less values. As a result, the breakdown voltage of the spark gap FS is no longer reached across the starting capacitor C1, and the pulse starting device generates no further starting pulses for the high-pressure discharge lamp La. The pulse starting device is therefore shut down without further outlay on components.

A two-wire connection between the operating unit EVG and the connection 40 of the high-pressure discharge lamp La suffices to supply power to the high-pressure discharge lamp La and to the pulse starting device accommodated in the lamp base 4, since the pulse starting device is supplied directly from the AC voltage present across the high-pressure discharge lamp.

FIG. 6 illustrates a further exemplary embodiment of the invention; it differs from the first exemplary embodiment of the invention illustrated in FIG. 1 only by the DC voltage isolating capacitor C0, which is connected between the secondary winding n2 of the starting transformer T and the auxiliary starting electrode ZE. The capacitance of the capacitor C0 can be selected freely within wide limits without appreciably influencing the starting operation. The capacitor C0 is preferably dimensioned such that the voltage drop across the capacitor C0 during the starting operation is smaller than the voltages setup between the auxiliary starting electrode ZE and the two electrodes of the high-pressure discharge lamp La. Very small capacitance values for the capacitor C0 for example 33 pF, therefore suffice. However, substantially larger values, such as 10 nF, are also possible for the capacitance of the capacitor C0. The DC voltage isolating capacitor C0 can also be integrated in a fashion similar thereto in the circuit arrangements in accordance with FIG. 2 to 4. It prevents direct current from flowing via the auxiliary starting electrode ZE and contributes to reducing the sodium loss, caused by the diffusion of sodium, in the discharge vessel of the high-pressure discharge lamp La. Specifically, in addition to xenon, the ionizable filling in the discharge vessel of the high-pressure discharge lamp LA also contains halides of the metals of sodium, scandium, zinc and indium.

TABLE 1

Dimensioning of the electric components, illustrated in FIGS. 3 and 4, for generating a starting voltage of approximately 30 kV

| | |
|---|---|
| C1 | 10 nF |
| C2 | 120 pF |
| D | BY505 |
| FS | 2000 V |

TABLE 1-continued

Dimensioning of the electric components, illustrated in FIGS. 3 and 4, for generating a starting voltage of approximately 30 kV

| | |
|---|---|
| L | 30 µH |
| R | 33 kOhm |
| T | n1 = 10 turns, n2 = 190 turns |

TABLE 2

Alternative dimensioning of the electric components, illustrated in FIGS. 3 and 4, for generating a starting voltage of approximately 5 kV

| | |
|---|---|
| C1 | 33 nF |
| C2 | 120 pF |
| D | two US1M in series |
| FS | 800 V |
| L | 30 µH |
| R | 10 kOhm |
| T | n1 = 10 turns, n2 = 75 turns |

What is claimed is:

1. A high-pressure discharge lamp having electrodes arranged inside a discharge vessel which define a discharge path of a gas discharge in the discharge vessel, and having a starting device, arranged inside the lamp base for the high-pressure discharge lamp and designed as a pulse starting device, for starting the gas discharge in the discharge vessel, and having, arranged outside its discharge vessel, an auxiliary starting electrode coupled to the pulse starting device, wherein the voltage input of the pulse starting device is connected in parallel with the discharge path of the high-pressure discharge lamp, a starting capacitor of the pulse starting device is arranged in a DC path connected in parallel with the discharge path of the high-pressure discharge lamp and at least one electric component designed as a constituent of a series resonant circuit is connected in parallel with the discharge path.

2. The high-pressure discharge lamp as claimed in claim 1, wherein a DC isolating capacitor is provided.

3. A method for operating a high-pressure discharge lamp, the starting voltage required to start the gas discharge in the discharge vessel of the high-pressure discharge lamp being generated with aid of a pulse starting device that applies voltage pulses during a starting phase to an auxiliary starting electrode, arranged outside the discharge vessel, of the high-pressure discharge lamp, wherein voltage across the discharge path of the high-pressure discharge lamp is fed as supply voltage to the pulse starting device, a current for charging a starting capacitor of the pulse starting device is generated from the voltage across the discharge path of the high-pressure discharge lamp wherein the discharge path of the high-pressure discharge lamp forms a bypass to the starting capacitor after starting of the gas discharge in the discharge vessel.

4. The method as claimed in claim 3, wherein a resonant AC voltage peak is provided via the discharge path of the high-pressure discharge lamp at least during the starting phase of the high-pressure discharge lamp.

* * * * *